United States Patent

Klein

[15] 3,638,047
[45] Jan. 25, 1972

[54] DELAY AND CONTROLLED PULSE-GENERATING CIRCUIT

[72] Inventor: Leonard F. Klein, Rockville Center, N.Y.

[73] Assignee: General Instrument Corporation, Newark, N.J.

[22] Filed: July 7, 1970

[21] Appl. No.: 53,041

[52] U.S. Cl. ..........................307/293, 307/215, 307/221 C, 307/246, 307/304, 328/37, 328/55

[51] Int. Cl. ....................................H03k 5/159, H03k 17/28

[58] Field of Search ..................328/37, 55; 307/304, 221 C, 307/251, 293, 215, 246

[56] References Cited

UNITED STATES PATENTS

| | | | |
|---|---|---|---|
| 3,105,197 | 9/1963 | Aiken | 328/55 X |
| 3,172,043 | 3/1965 | Altman | 328/55 |
| 3,252,009 | 5/1966 | Weimer | 307/221 C |
| 3,471,711 | 10/1969 | Poschenrieder et al. | 328/37 X |
| 3,546,490 | 12/1970 | Sangster | 307/293 |

*Primary Examiner*—John S. Heyman
*Attorney*—James and Franklin

[57] ABSTRACT

A delay circuit comprising a plurality of MOSFETS connected in series with their gates tied to their drains. The input signal is delayed by each FET an interval equal to the time required to charge its gate terminal to the threshold voltage of the device. The signals generated at the junction of the output circuits of different FETs may be used to generate pulses of controlled width and phase relationship. Means to discharge the junction nodes are provided.

20 Claims, 4 Drawing Figures

INVENTOR
LEONARD F. KLEIN
BY James and Franklin
ATTORNEY

INVENTOR
LEONARD F. KLEIN
BY James and Franklin
ATTORNEY

DELAY AND CONTROLLED PULSE-GENERATING CIRCUIT

The present invention relates to logic circuits and particularly to circuits for producing a delay in signal propagation.

In one form of binary logic circuit, pulse-type signals are utilized to represent the two logic conditions, logic "1" generally being represented by a negative pulse and logic "0" being represented by the absence of a negative pulse. In circuits of this type some means must be provided to synchronize the timing of the pulse with respect to some reference time so that individual digits can be properly identified. Moreover, the proper generation of algebraic combinations through AND, OR and NOT circuits and combinations thereof may require that two or more pulses to be combined must arrive at a particular logic gate simultaneously. The foregoing requirements necessitate the use of time clock pulses to provide time-controlled switching in each switching circuit of a logic array.

Digital or computer circuitry of the type described is adapted to store and operate on such pulse-type signals by means of a few basic components—logic gates such as AND, OR, and NOT circuits, shift registers, counters and storage devices such as flip-flops (one digit storage) and memory units (bulk storage). In systems where power dissipation is not a significant factor, often only some of these circuits are clocked to transfer the data pulses during particular intervals, the other circuits performing their various functions on such data pulses sequentially as fast as the switching components will allow. The time it takes for such signals to be propagated through the various logic chains in such systems is termed propagation delay. When it is desired that two or more data pulses be combined at a particular gate the system must be designed to deliver such pulses to the gate simultaneously in order to avoid extraneous unwanted transitory signals. Variations in propagation delay of the various incoming signals is generally compensated for by delay means. Commonly this is accomplished through the use of capacitors at various points in the system. Such capacitive delay means are extremely space consuming and rather imprecise in producing the necessary controlled compensating delay.

In the course of digital circuit development, conventional bipolar transistors long ago replaced vacuum tubes as the operative circuit elements. However, these transistors have at least one serious disadvantage in digital circuits of the type described—a low impedance that causes each state in a digital array to present a substantial load to the driving stages. The field effect (unipolar) transistor (FET) was early conceived as a solution to this problem. It is only recently, however, that the art has advanced to the stage in which such devices, and particularly insulated gate or metal oxide silicon (MOS) FET's, are commercially feasible. MOSFET's are voltage-controlled devices which exhibit an extremely high input impedance (in the range of $10^{12}$ to $10^{14}$ ohms). MOS technology is particularly well suited to the field of large complex integrated circuits because of its ability to integrate more functions on a chip and to give consistently higher yields than today's bipolar technology. Accordingly MOS logic is today prevalent in the fabrication of large-scale integrated circuits of the type here under consideration.

It is a primary object of the present invention to provide a delay circuit for use with MOS logic circuits for producing a variable controlled time delay in signal propagation.

More particularly, it is a further object of the present invention to provide such a delay circuit which utilizes no separate capacitors, is easy to fabricate and takes up a minimum of space.

It is still a further object of the present invention to provide a delay circuit for use in a pulse generator which is adapted to produce output pulses of precisely controlled width and phase relationship.

It is another object of the present invention to design a pulse generator circuit utilizing a delay circuit adapted to produce a plurality of identical delay intervals, said intervals being controllable by varying the rise time of the input signal.

To these ends, the present invention comprises a delay circuit having a plurality of voltage-controlled switching devices connected in series and having their control terminals connected to their output circuits. The devices are sequentially rendered conductive in response to an input signal as their control terminals are charged to the turn-on or threshold voltage of said devices. The total delay is equal to the delay interval for each device to turn on multiplied by the number of devices in the circuit. Thus, any multiple of the basic delay interval may be produced by taking the signal off the output of a given device.

The aforementioned delay circuit is particularly useful in generating a narrow pulse or series of pulses of controlled width and phase relationship by feeding different delay signals and complements thereof having different delays into the inputs of a NOR gate connected in series with a load resistor across a reference voltage source.

To the accomplishment of the above and to such other objects as may hereinafter appear, the present invention comprises a delay circuit and pulse generator as defined in the appended claims and as described herein taken together with the accompanying drawings in which:

Figure 1:
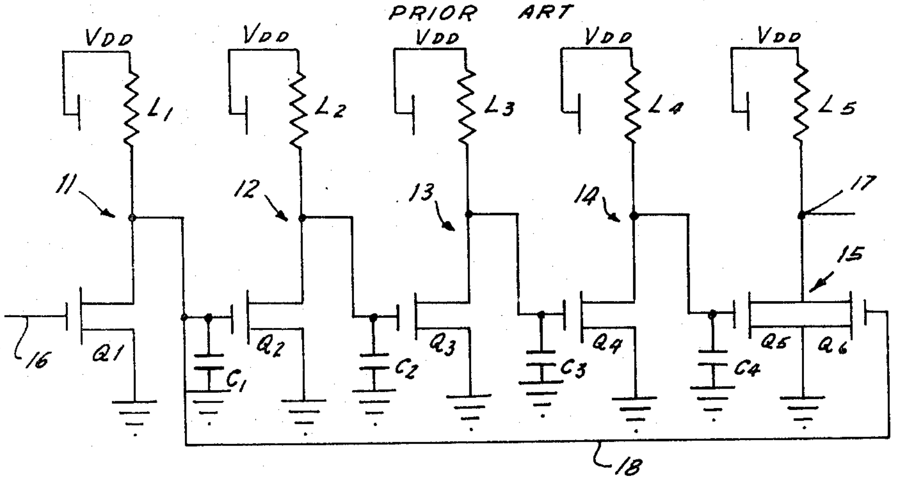
FIG. 1 PRIOR ART
FIG. 1 is a circuit diagram of a prior art delay circuit comprising a series of inverters utilizing capacitive delay means.

A primary use for delay circuits of the type described is in generating a narrow pulse of from 10 to 20 $\mu$s. duration. These narrow pulses may be used, for instance, in shift registers and counters, and as timed clock signals to synchronize logical operation or to set and reset flip-flops. FIG. 1 shows a prior art circuit for generating such a pulse. As there shown, the circuit consists of four inverter stages designated 11, 12, 13, 14 connected in cascade and feeding into a NOR gate generally designated 15. Each inverter stage comprises a load device (L1, L2, L3, L4) in series with a switching FET (Q1, Q2, Q3, Q4) between a negative voltage supply $V_{DD}$ and ground. The load devices are commonly high resistance FET's having their gates returned to their drains and thus functioning as high-resistance diodes. The output of each inverter stage at the junction between its load device and switching FET is fed into the gate terminal of the switching FET in the next stage. Capacitors designated C1, C2, C3, C4 are defined at the gate terminal of each successive stage to provide the necessary propagation delay. While capacitors C1–C4 may be merely the stray or interelectrode capacitances of the associated FET devices, it is usually necessary to integrate separate capacitors on the chip to provide a sufficient delay without utilizing an excessive number of stages which would increase power consumption and take up considerable space on the chip. The first inverter stage 11 receives an input signal at the gate terminal 16 of its switching FET Q1. The input signal is commonly a wide pulse from a conventional 60 -cycle source having a pulse width of approximately 16 milliseconds. NOR-gate 15 comprises FET's Q5 and Q6 connected in parallel between an output node 17 and ground. A load device L5 is connected between the negative $V_{DD}$ supply and output node 17. The last inverter stage 14 has its output signal impressed on the gate terminal of FET Q5 as one input to NOR gate 15. The other input (at the gate of FET Q6) is taken off the output of inverter stage 11 via lead line 18.

In operation capacitors C1–C4 and output node 17 are all charged negative through load devices L1–L5. Depending upon the signal at switching FETs Q1–Q4, capacitors C1–C4 will be simultaneously discharged to ground or isolated from ground and remain charged. In the circuit shown in FIG. 1, the operative portion of the input signal at terminal 16 occurs at the negative going edge, i.e., the signal goes from more positive to more negative. Before this transition FET Q1 is nonconductive and capacitor C1 is charged, FET Q2 is conductive and capacitor C2 is discharged, FET Q3 is nonconductive and capacitor C3 is charged, and FET Q4 is conductive and capacitor C2 is discharged. Accordingly, the inputs to FETs Q5 and Q6 of NOR gate 15 are positive (ground) and negative respectively and output node 17 is discharged through conductive FET Q6. As the input signal at gate terminal 16 goes negative, FET Q1 is rendered conductive and discharges previously charged capacitor C1. At the same time the input to FET Q6 also goes to ground (since it is connected to capacitor C1 via lead line 18) and FET Q6 is rendered nonconductive. The transition is propagated through the remaining three inverter stages, capacitor C4 eventually being charged negative to render FET Q5 conductive. It will be apparent, however, that during the brief time it takes for the transition to be propagated from capacitor C1 to capacitor C4, both inputs to NOR gate 15 are positive and FET's Q5 and Q6 are both nonconductive isolating output node 17 from ground. Thus during this brief propagation delay the output at node 17 exhibits a narrow pulse. The width of the pulse is determined by the delay in propagation of the input signal through each inverter stage. This in turn is determined by the capacitance and resistance values chosen and, of course, the number of inverter stages used. Thus, the desired delay must be designed into the circuit by utilizing a sufficient number of inverter stages and capacitors of sufficient size. (In practice the desired delay is approximately 10–20 μs. long.) It should be noted that the delay is unaffected by the rise time of the negative going edge of the input signal provided there is sufficient gain at the first inverter stage. Accordingly, the desired delay must be determined at the time of fabrication.

Figure 2:
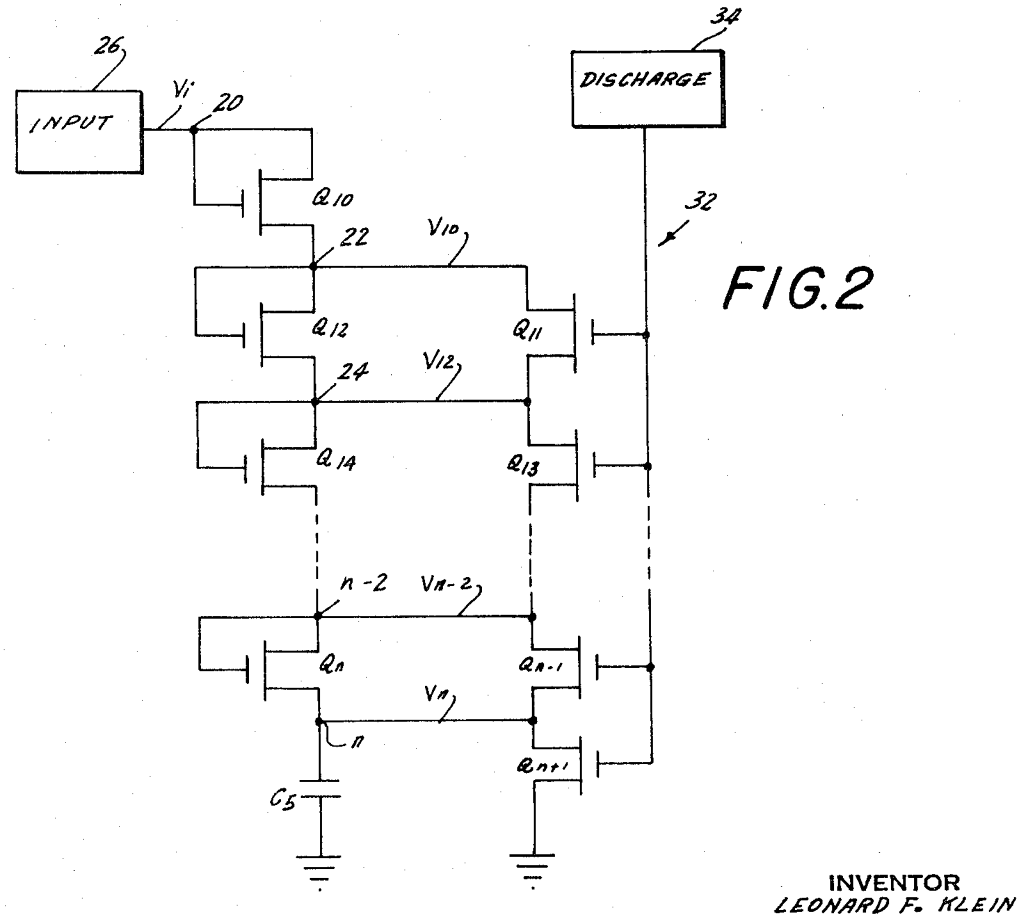
FIG. 2 is a circuit diagram of the delay circuit of the present invention with associated discharge means.

The delay circuit of the present invention is illustrated in the left hand portion of FIG. 2. As there shown, the circuit comprises a plurality of FET's designated Q10, Q12, Q14...Qn having their output circuits connected in series between an input node 20 and an output node n. Each FET has its gate terminal tied to its drain terminal at junctions 20, 22, 24....*n*, respectively. As a result the output signal from FET Q10 at 22 is applied to the gate of FET Q12, the output of FET Q12 at 24 is applied to the gate of FET Q14, etc. Nodes 20 and *n* may be connected to appropriate points in a circuit at which delay is required.

In order to understand the operation of this circuit, a brief discussion of the operation of MOSFETS is appropriate.

A typical MOSFET (P channel enhancement mode) comprises an N-type silicon substrate with two highly doped P-type spaced regions diffused therein defining the source and the drain. A thin insulating material, typically silicon dioxide, is disposed over the silicon substrate between the source and the drain, thereby forming the gate dielectric, upon which the gate electrode is deposited.

If the gate is at zero potential with respect to the source, no current flow from source to drain because the PN-junctions are reverse biased. However, as the gate is made more negative, more and more positively charged holes are induced into the region at the substrate surface (the channel) to compensate for the N-type doping of the substrate. When enough holes have been accumulated in the channel region, the surface of the silicon changes from electron-dominated to hole-dominated material, channel changes from N-type to P-type, and ohmic conduction occurs through the channel between source and drain. Making the gate more negative drives the inversion layer deeper and increases conduction.

The voltage level at which conduction first occurs is known as the threshold voltage $V_T$ of the device. $V_T$ is generally determined at the time of fabrication and is substantially the same for devices fabricated on the same chip (usually from −3.5 to −5.0 volts).

Referring again to FIG. 2 with the connections there shown, FETs Q10–$Q_n$ are said to be operating in the saturation region. Under these conditions drain current begins to flow when the gate bias reaches $V_T$ and continues to increase as the square of the negative gate bias above $V_T$.

Thus, if all nodes are initially at ground, when a negative voltage $V_i$ greater than $V_T$ is applied at node 20, FET Q10 is rendered conductive and current begins to flow from node 20 to node 22. When the stray capacitance at node 22 is charged to the $V_T$ level FET Q12 is rendered conductive and current begins to flow from node 22 to node 24. This process continues until all FETs are rendered conductive and the input signal appears at node *n*. The input signal thus appears at each node successively after a delay interval equal to the time it takes to charge the preceding node to $V_T$. It will also be noted that in addition to the delay, the signal level at each successive node is reduced by the one threshold voltage drop across each device necessary to initiate conduction. Thus, the number of FET's which may be connected in this manner without dissipating the negative input signal below its logic "1" level is limited by the initial level of the input signal. Negative voltage supplies, however, are commonly many times more negative than the operative logic "1" level, so that a substantial number of devices may usually be provided. It will be apparent that by connecting node 20 to the input signal source, any desired delay equal to a multiple of the basic delay interval may be accomplished by taking the output signal off the appropriate node. The circuit may thus be used wherever delay in signal propagation is required, for example to eliminate a race condition or compensate for other unavoidable propagation delays.

In the example illustrated in FIG. 2 the delay circuit is used to generate a narrow pulse. Thus, the circuit is there shown connected between an input source 26 and a capacitor C5 the other side of which is connected to ground. In practice input source 26 may be any conventional oscillating input such as one producing the 60-cycle pulse shown in FIG. 4. As the input signal $V_i$ goes negative along the ramp 28 each successive FET will be rendered conductive as its ramp input reaches $V_T$, all nodes eventually being charged negative. The basic delay interval may be controlled by the slope of the ramp input so that the signals V10–Vn at nodes 20–*n* are successively delayed any desired interval. A pulse of any given pulse width may thus be generated in a manner similar to that used in the prior art circuit of FIG. 1.

Figure 3:
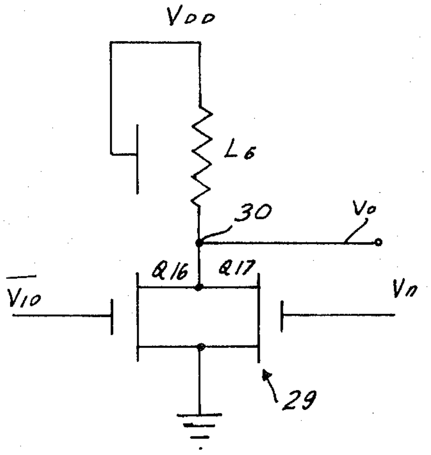
FIG. 3 is a circuit diagram of a pulse generator utilizing the delayed output signals from the delay circuit of the present invention.

The pulse-generating circuit is illustrated in FIG. 3 and comprises a NOR-gate 29 connected in series between a load resistor L6 and ground. Again load resistor L6 will commonly be a load FET having a high "on" resistance and having its gate terminal returned to its drain terminal. NOR-gate 29 comprises switching FETs Q16 and Q17 connected in parallel. An output node 30 is defined at the junction between NOR-gate 29 and load resistor L6. By utilizing any two of the output signals V10–Vn of FIG. 2, having a given delay interval between them, a pulse having a duration equal to that given interval may be generated at node 30. As shown in FIG. 3, this is accomplished by applying the more delayed signal V*n* to one input of NOR-gate 29 (hence to the gate of FET Q17) and the complement of the other signal, for instance $\overline{V}_{10}$, to its other input (here the gate of FET Q17). Any conventional inverter circuit with sufficient gain such as the inverter stage of FIG. 1 may be used to generate $\overline{V}_{10}$. Thus, $\overline{V}_{10}$ is initially negative and Vn is initially positive, node 30 being discharged through conductive FET Q16. As the input goes negative along ramp 28, $\overline{V}_{10}$ goes positive rendering FET Q16 nonconductive. At this point node 30 is isolated from ground by nonconductive FET's Q16 and Q17 and node 30 is charged negative by the $V_{DD}$ supply via load resistor L6. After the *n* basic delay intervals necessary to charge the gate of FET Qn to $V_T$, $V_n$ goes negative and renders FET Q17 conductive discharging node 30 to ground. Thus, during the chosen delay interval both FETs Q16 and Q17 of NOR-gate 29 are nonconductive and the output $V_o$ at node 30 exhibits a narrow pulse *p* (see FIG. 4).

Figure 4:
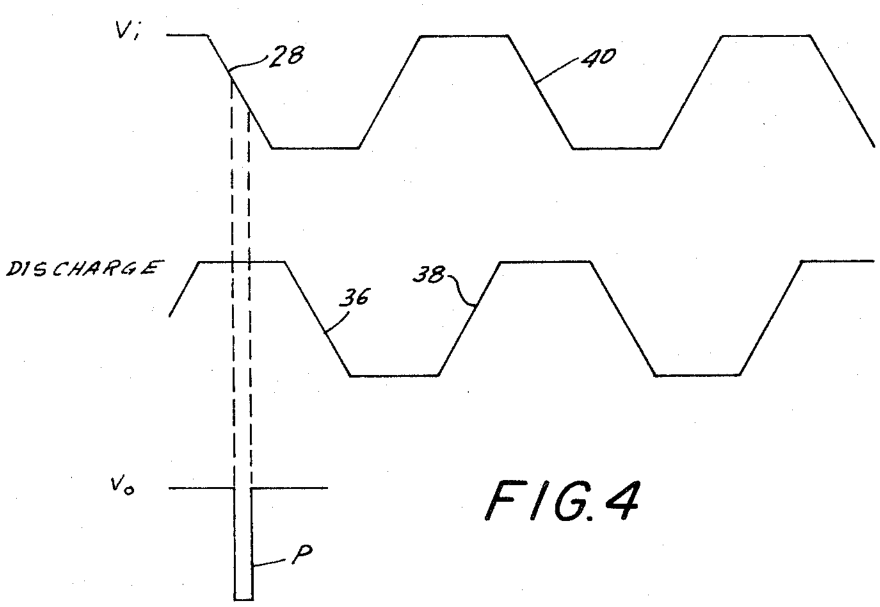
FIG. 4 is a graphical illustration of the time relationship of one form of input and discharge signal and the associated pulse.

Referring again to FIG. 2, means generally designated 32 are provided to discharge all nodes in preparation for the next negative going edge of the input signal. As there illustrated discharge means 32 comprises a plurality of discharge FETs Q11–Qn+1 connected in series between node 22 and ground. Discharge FET's Q11–Qn−1 each have their output circuits individually connected in parallel with the output circuits of FET's Q12–Qn respectively and Qn+1 is connected in parallel with capacitor C5 between node $n$ and ground. It should be noted that capacitor C5 and FET Qn+1 are unnecessary to the operation of the circuit. They are here included merely to provide a signal at node $n-2$ of a magnitude sufficiently above threshold to serve as an operative signal. Each discharge FET receives a discharge signal from discharge signal generator 34 at its gate terminal. It will be apparent that the discharge signal may be any signal which goes negative subsequent to the negative going edge 28 of the input signal from input signal source 26. For purposes of illustration discharge signal is shown in FIG. 4 as being identical to the 60 -cycle input but phase displaced approximately 90°. It will be seen that the discharge signal remains positive during the negative going edge 28 of the input signal, during which time the delayed signals sequentially appear at nodes 22–$n$. During this period FETs Q11–Qn+1 will accordingly be noncuductive. After all nodes have reached their negative values, the discharge signal goes negative at 36 rendering all discharge FET's conductive to discharge all nodes 22–$n$ to ground. It will be apparent that as all nodes are discharged the two input signals to NOR gate 29 merely reverse polarity, that is, $V_n$ goes positive and $V_{10}$ goes negative. Thus node 30 which was formerly discharged through FET Q17 remains discharged through FET Q16. As illustrated the discharge signal returns to ground at 38 prior to the next negative going edge 40 of the input signal so that nodes 22–$n$ may again be charged negative during this negative going edge.

It will be apparent that a pulse or series of pulses of any desired width and phase relationship may be generated using the circuits of FIGS. 2 and 3. In this regard the present circuits may have wide utilization as clock generator circuits. For example, the four clock pulses of a conventional four phase clock system may be generated directly by utilizing four of the circuits shown in FIG. 3 with the appropriate input signals and complements thereof taken from nodes 22–$n$ of the delay circuit of FIG. 2. Purely by way of illustration, the first two overlapping clock phases of such a four-phase system might be generated by feeding $\overline{V}_{10}$ and $V_{12}$ into a first NOR gate and $\overline{V}_{10}$ and the next subsequent output $V_{14}$ (not shown) into a second NOR gate. Since any pulse width or phase displacement equal to the basic delay interval between successive nodes 22–$n$ is possible and since the basic interval may be conveniently varied by changing the slope of the input ramp 28, the present circuits provide a wide latitude in pulse width and phase relationship without modification of the circuits. The frequency of each clock pulse is, of course, determined by the input frequency which is likewise controllable without circuit modification.

The circuit of the present invention provides all the foregoing advantages without the use of discrete capacitors which are expensive to fabricate and take up valuable space on the chip.

While only one embodiment of the present invention is here specifically described, it will be apparent that many variations may be made therein all within the scope of the instant invention as defined in the following claims.

I claim:

1. A delay circuit for producing a delay in signal propagation from a first point to a second point, comprising a plurality of switching devices each said switching device comprising a chargable control terminal and two output circuit terminals, each of said devices being normally nonconductive and adapted to be rendered conductive upon the charging of its control terminal to a voltage of a given magnitude relative to one of its output terminals said switching devices being connected with their output terminals in series between said first and second points, the chargable control terminal of the first of said switching devices being operatively connected to said first point whereby it is charged to the voltage level of said first point, and the chargable control terminals of each successive switching device being operatively connected to the junction between its output circuit terminal and the output circuit terminal of the preceding switching device to automatically and sequentially charge said control terminals of said successive switching devices to the voltage level of said junctions, respectively, whereby each said switching device delays said signal by an interval equal to the time required to charge its control terminal to said voltage of given magnitude.

2. In the delay circuit of claim 1, an input signal source, said first point being connected to said source, said second point being operatively connected to a reference voltage source, and the junction between the output circuits of successive switching devices defining output nodes, whereby the output signal at each of said output nodes comprises said input signal delayed by a number of said intervals equal to the number of said devices connected between said output node and said first point.

3. The circuit of claim 1, wherein said switching devices are field effect transistors, said control terminals comprising the gate terminals thereof and said output circuit terminal comprising the source and drain terminals thereof.

4. The circuit of claim 2, wherein said switching devices are field effect transistors, said control terminals comprising the gate terminals thereof and said output circuit terminals comprising the source and drain terminals thereof.

5. The circuit of claim 2, wherein said input signal source produces a ramp-shaped signal, whereby delay interval is a function of the slope of the ramp.

6. The circuit of claim 2, further comprising means to discharge said output nodes through a separate discharge path subsequent to the appearance of said delayed signals thereat.

7. The circuit of claim 6, wherein said source produces an input signal comprising a recurring pulse having a transition from a first to a second signal level in the form of a ramp, and wherein said discharge means comprises a second plurality of switching devices each having their output circuit terminals connected in parallel with the output circuit terminals of different ones of said first mentioned plurality of switching devices, and means for applying a discharge signal to their control terminals.

8. The circuit of claim 7, wherein said discharge signal is identical to said input signal but out of phase therewith.

9. A pulse-generating circuit comprising the circuit of claim 2, and further comprising means to invert a first one of said output signals, and a "NOR" gate, said inverted output signal and a second of said output signals comprising the inputs to said "NOR" gate, whereby the resulting "NOR" gate output comprises a pulse having a width equal to the delay between said first and second output signals.

10. The circuit of claim 9, wherein said switching devices are field effect transistors, said control terminals comprising the gate terminals thereof and said output circuit terminals comprising the source and drain terminals thereof.

11. The circuit of claim 9, wherein said input signal source produces a ramp-shaped signal.

12. The circuit of claim 9, wherein said input signal source produces an input signal comprising a recurring pulse having a transition from a first to a second signal level in the form of a ramp, and means to discharge said output nodes subsequent to the appearance of said delayed signals thereat comprising a second plurality of switching devices each having their output circuit terminals connected in parallel with the output circuit terminals of different ones of said first-mentioned plurality of switching devices, and means for applying a discharge signal to their control terminals.

13. The circuit of claim 12, wherein said discharge signal is identical to said input signal but out of phase therewith.

14. A multiphase clock-generating circuit comprising the circuit of claim 2, in combination with a plurality of "NOR" gates and means to invert said output signals, a given output signal and the inversion of another signal being applied as the inputs to a given NOR gate, whereby the resulting NOR gate outputs comprise a plurality of timed clock pulses having a width and phase relation to each other determined by the particular output signals and inverted output signals applied to their respective NOR gates.

15. The circuit of claim 14, wherein said switching devices are field effect transistors, said control terminals comprising the gate terminals thereof and said output circuit terminals comprising the source and drain terminals thereof.

16. The circuit of claim 14, wherein said input signal source produces a ramp-shaped signal.

17. The circuit of claim 2, wherein said input signal means produces a signal comprising a recurring pulse having a transition from a first to a second signal level in the form of a ramp, and means to discharge said output nodes subsequent to the appearance of said delayed signals thereat comprising a second plurality of switching devices each having their output circuit terminals connected in parallel with the output circuit terminals of different ones of said first-mentioned plurality of switching devices, and means for applying a discharge signal to their control terminals.

18. The circuit of claim 17, wherein said discharge signal is identical to said input signal but out of phase therewith.

19. A delay circuit for producing a delay in signal propagation between a first point and a second point comprising conductive means extending between said first and second points, a plurality of switching means operatively interposed in series in said conductive means from said first point to said second point and when closed establishing a conductive path between said first and second points, said switching means when closed each producing an inherent signal level drop thereacross, and means operatively connected to each of said switching means, responsive to the signal level at one side thereof for closing same, whereby upon application of an input signal at said first point, said switching means are automatically closed in sequence from said first to said second point thereby to produce a delay interval in signal propogation of said input signal from said first point to said second point, a conductive path being established between said first and second points after said interval of delay, said delay being a function of the magnitude of said signal level drop and the rate of change of said signal level of said input signal.

20. The delay circuit of claim 19, wherein said means for closing said switching means is responsive to the potential difference across said switching means and is effective to close said switching means in response to a magnitude of said potential difference greater than the magnitude of said signal level drop.

* * * * *